March 18, 1958

N. H. CHRISTOPHER 2,827,522

READING HEAD

Filed June 1, 1954

Nathan H. Christopher,
Inventor,

By [signature]

His Attorney.

United States Patent Office 2,827,522
Patented Mar. 18, 1958

2,827,522

READING HEAD

Nathan H. Christopher, Falls Church, Va.

Application June 1, 1954, Serial No. 433,851
5 Claims. (Cl. 200—46)
(Granted under Title 35, U. S. Code (1952), sec. 266)

The invention described in the following specification and claims may be manufactured and used by or for the Government for governmental purposes, without the payment to me of any royalty thereon.

This invention is in recording and reproducing equipment and particularly is a novel reading head for perforated paper tapes, although, as will be apparent from the description to follow, it is not entirely limited in use thereto.

The principal object of the invention is to provide a tape reader which eliminates the necessity for feeler pins, conventional electric contacts, etc.

Another object is to provide a tape reader which can read at a high rate of speed with little danger of tape breakage.

A further object is to provide a tape reader wherein electrical contact is made through any perforation in a tape by means of pressure exerted on an electrically conductive resilient roller which forms a part of the reading device.

More specifically, it is an object of the invention to provide a reading head of novel conformation, a roller made of resilient conductive material cooperating with the head and, in operation, separated therefrom only by the thickness of a tape, and means for applying pressure to the roller. Other objects will be apparent from a reading of the following specifications and claims.

Figures 1, 3:
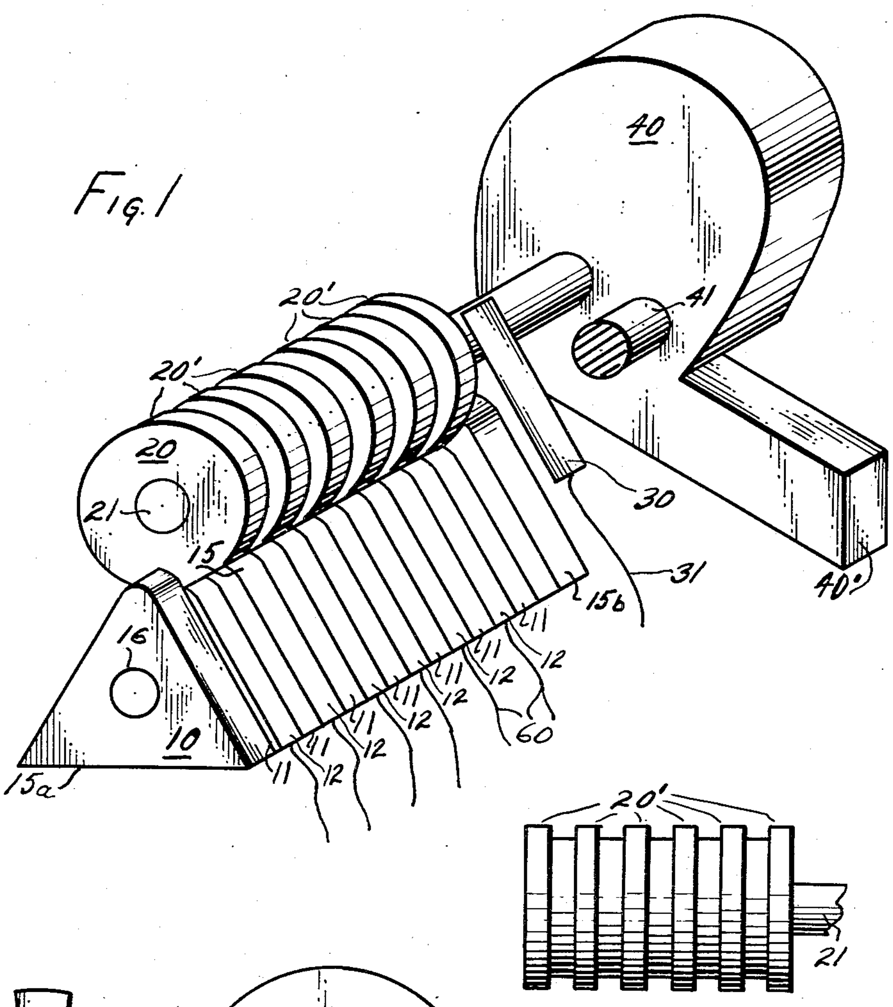
Figure 1 is an isometric view of the principal elements of the invention.
Figure 3 is an elevation of a special roller which forms a part of the invention.
Figure 2:
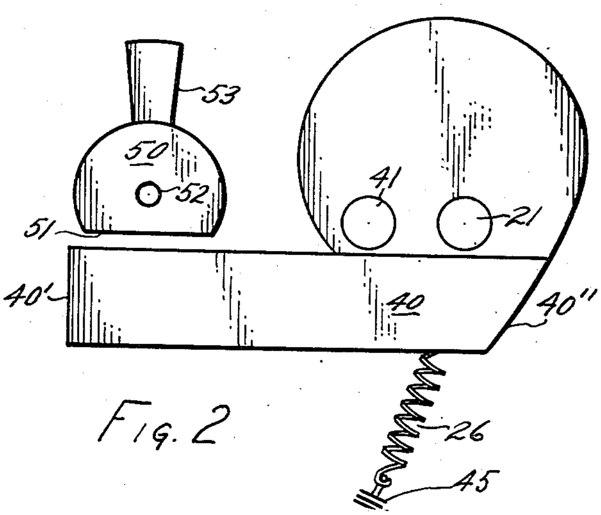
Figure 2 is an elevation of a portion of the apparatus illustrating in some detail features not shown or not fully shown in Figure 1.

Referring now to the drawings, 10 represents the reading head proper of my invention, and it consists essentially of laminations 11 of non-conducting material, synthane, for example, and intervening laminations 12 of conducting material, as steel. The reading head is shown roughly triangular in cross-section, but it should be understood that this is largely a matter of choice except that, if some other shape should be selected, it should provide a protrusion, hump, or other surface of restricted cross-section, analogous to apex 15 of the head shown. The laminations which together form reading head 10 are firmly secured in proper relation to each other by means of retainer blocks **15*a* and 15*b* and a bolt 16 which passes through the laminations and retainers, it being insulated in any convenient fashion from the laminations 12**.

Just above reading head 10 may be seen a roller 20 consisting of a plurality of spaced ribs 20'. This roller in the preferred embodiment of the invention is made of conductive rubber, well known in the art; it must, at least, include the properties of conductivity and resilience. It is mounted on a spindle 21 of steel or other conductive material which must be of such proportions as to resist substantial bending in such operations as will be hereinafter described.

Adjacent to roller 20 is an electrical contact 30, fed by a lead 31, connected to any convenient source of potential (not shown). Member 30 is adapted to make sliding contact with spindle 21 and to place a charge upon roller 20. Many other means of placing a potential upon roller 20 will suggest themselves.

Behind contact 30 there will be seen a lever-like member 40, rotatable upon a pivot 41 which, in turn, is mounted in any convenient support, such support being, however, necessarily adjacent spindle 21 since the spindle itself passes through one end of the lever.

Adjacent the other end of lever member 40, that is, on the opposite side of pivot 41 from spindle 21, is mounted a camming member 50, here shown as a disc with a portion of its periphery ground away, as at 51. The camming member is mounted on a pivot 52, supported as desired. The camming device is provided with a handle 53 for turning the same into cooperative relationship with lever 40, it being apparent that if cam 50 is turned through approximately 90° in either direction from the position shown, it will contact, and force downwardly, the portion 40' of lever 40 and, acting in conjunction with pivot 41, will raise the other end 40'' of the lever and, with it, spindle 21, the result being that roller 20 is lifted away from reading head 10.

The lifting of end 40'' of lever 40 is accomplished against the resistance of a spring 26 which is secured to the lower portion of the lever member and, at its other end, to any convenient support, as 45. The spring, in other words, tends to hold the parts in the positions shown in Figure 1.

Power must be supplied for turning spindle 21, and this may be assumed to be in the nature of a variable speed motor mounted within lever member 40. Other driving means may readily be utilized.

In operation, cam 50 is turned upon pivot 52 in order to separate roller 20 from reading head 10, and a perforated paper tape is fed over apex 15 of head 10 from a supply reel to a take-up reel (neither of which is shown since the tape supply system forms no part of the present invention). It is important, however, that the tape be fed from and taken up from below the level of apex 15, so that the tape is bent as it passes beneath roller 20. With the tape in place, cam 50 is returned to the position shown, and spring 26, acting on lever member 40, forces spindle 21 and roller 20 downwardly upon the tape.

It should be understood at this point that the conductive laminations 12 of reading head 10 are so dimensioned, and so spaced from each other by the insulating laminations 11, that they register exactly with the several columns or levels of perforations in the tape to be read, and similarly that the ribs 20' of the rubber roller are spaced so as to register with the tape perforations.

If, in this situation, with contact 30 connected to a source of a potential, and riding upon spindle 21, rotative power is applied to the spindle, the tape is driven over reading head 10. When a perforation passes thereover, electrical contact is made therethrough as the conductive rubber is caused through the cooperation of its own resiliency, the pressure exerted by spring 26, and the bending of the tape through a rather sharp angle over the apical reading surface proper of reading head 10 to protrude through the perforations and make brief sliding contacts with one or more of the conductive laminations 12.

It will be noticed that each of the conductive laminations is provided with a lead, as 60, all of such leads feed into some using apparatus; the nature of which is not important to this invention.

The foregoing is in specific terms, and many modifications will suggest themselves, so that, for the true scope of the invention, reference should be had to the appended claims.

I claim:

1. In an apparatus of the nature described, a reading head proper having a fixed surface over which a perforated tape may be bent, said surface including electrically conductive portions disposed to register with the perforations in said tape, a resilient roller having an electrically conductive surface, means for electrically charging said roller, means for forcing said roller upon a tape substantially coextensively with said first-mentioned surface, and means for rotating said roller.

2. A tape reading head comprising alternate laminations of conductive material and insulating material the conductive laminations being so spaced by said insulating laminations as to register with the several levels of perforations of a tape the head being formed to present a smoothly rounded apical reading surface.

3. A roller comprising a cylinder of resilient electrically conductive material having a plurality of spaced integral annular ribs.

4. A reader for tape containing a plurality of levels of perforations comprising a fixed reading head proper made up of electrically conductive portions spaced to register with said levels of perforations in the tape the spaces between said electrically conductive portions being electrically non-conductive the conformation of the head permitting a tape to be bent substantially as it passes thereover, a roller of resilient electrically conductive material having one position for cooperating with said head at the point at which the tape may be bent and another position spaced from said head said roller comprising a plurality of spaced ribs registering when said roller is in its first mentioned position with the said conductive portions of said head, means for applying potential to said roller, means for rotating said roller, and means for causing said roller to assume its two said positions.

5. The method of reading a perforated tape which includes moving the same in bent conformation over a fixed surface having electrically conductive portions in registry with the perforations thereof and pressing thereupon an electrically conductive rotating resilient surface to cause portions of the latter to protrude through any perforations and into rubbing contact with said portions.

References Cited in the file of this patent

UNITED STATES PATENTS 2,297,772 Johnson ---------------- Oct. 6, 1942